United States Patent [19]
Alford et al.

[11] Patent Number: 5,613,201
[45] Date of Patent: Mar. 18, 1997

[54] AUTOMATIC CALL DESTINATION/SYSTEM SELECTION IN A RADIO COMMUNICATION SYSTEM

[75] Inventors: George C. Alford, Plano; Yamin Damghani, Dallas; Nickolas A. Avdonin, North Richland Hills, all of Tex.; Billy G. Moon, Apex, N.C.

[73] Assignee: Uniden America Corporation, Fort Worth, Tex.

[21] Appl. No.: 506,461

[22] Filed: Jul. 25, 1995

[51] Int. Cl.$^6$ ................. H04Q 7/38; H04B 7/26
[52] U.S. Cl. .................. 455/331; 455/56.1; 455/89; 455/186.1
[58] Field of Search ................. 455/33.1, 54.1, 455/56.1, 89, 54.2, 185.1, 186.1, 62; 379/58, 59, 60

[56] References Cited

U.S. PATENT DOCUMENTS

| | | | |
|---|---|---|---|
| 4,672,657 | 6/1987 | Dershowitz | 379/63 |
| 4,896,370 | 1/1990 | Kasparian et al. | 455/89 |
| 4,905,301 | 2/1990 | Krolopp et al. | 455/34 |
| 4,969,209 | 11/1990 | Schwob | 455/186.1 |
| 4,989,230 | 1/1991 | Gillig et al. | 379/59 |
| 5,153,904 | 10/1992 | Coombes et al. | 379/58 |
| 5,159,625 | 10/1992 | Zicker | 379/59 |
| 5,214,789 | 5/1993 | George | 455/33.2 |
| 5,261,117 | 11/1993 | Olson | 455/56.1 |
| 5,276,905 | 1/1994 | Hurst et al. | 455/33.1 |
| 5,408,419 | 4/1995 | Wong | 455/89 |
| 5,437,053 | 7/1995 | Sawa et al. | 455/33.1 |
| 5,442,806 | 8/1995 | Barber et al. | 455/54.1 |
| 5,448,765 | 9/1995 | Kovanen et al. | 455/89 |

*Primary Examiner*—Reinhard J. Eisenzopf
*Assistant Examiner*—Lester G. Kincaid
*Attorney, Agent, or Firm*—Daniel R. Brown

[57] ABSTRACT

A method and apparatus for placing calls in a multi-system land mobile radio network. A plurality of call destinations are linked or grouped together into a call group. Each call destination has a preferred system. Selection of a first call destination points to or is linked to at least a second call destination. If the preferred system for a current call destination is not accessible, then a second call destination, selected in accordance with the first call destination is made the current call destination. Selecting a call group causes a radio to attempt a plurality of call destinations, each in sequence, until an accessible preferred system is found, indicating that the current call destination is valid. If an accessible system is found, then the call is placed thereto.

20 Claims, 12 Drawing Sheets

SYSTEM TABLE

| RPTR | S1 | S2 | S3 | S4 | S5 | S6 | S7 | S8 | S9 | S10 |
|---|---|---|---|---|---|---|---|---|---|---|
| 1 | 200 | 410 | 47 | | | | | | | |
| 2 | | | | | | | | | | |
| 3 | 220 | 430 | 67 | | | | | | | |
| 4 | | | | | | | | | | |
| 5 | 240 | 450 | 87 | | | | | | | |
| 6 | | | | | | | | | | |
| 7 | 260 | 470 | | | | | | | | |
| 8 | | | | | | | | | | |
| 9 | 280 | 490 | | | | | | | | |
| 10 | | | | | | | | | | |
| 11 | | 510 | | | | | | | | |
| 12 | | | | | | | | | | |
| 13 | | 530 | | | | | | | | |
| 14 | | | | | | | | | | |
| 15 | | 550 | | | | | | | | |
| 16 | | | | | | | | | | |
| 17 | | 570 | | | | | | | | |
| 18 | | | | | | | | | | |
| 19 | | 590 | | | | | | | | |
| 20 | | | | | | | | | | |
| HR | 01 | 17 | 03 | | | | | | | |

FIG. 6

ID CODE TABLE

| | S1 | S2 | S3 | S4 | S5 | S6 | S7 | S8 | S9 | S10 |
|---|---|---|---|---|---|---|---|---|---|---|
| G1 | 001 | 090 | 014 | | | | | | | |
| G2 | 007 | 201 | 211 | | | | | | | |
| G3 | 188 | | | | | | | | | |
| G4 | | | | | | | | | | |
| G5 | | | | | | | | | | |
| G6 | | | | | | | | | | |
| G7 | | | | | | | | | | |
| G8 | | | | | | | | | | |
| G8 | | | | | | | | | | |
| G10 | | | | | | | | | | |

FIG. 7

AUTOMATIC CALL DESTINATION/SYSTEM SELECTION IN A RADIO COMMUNICATION SYSTEM

TECHNICAL FIELD OF THE INVENTION

This invention is related to communications systems. In one embodiment, a process for placing calls in a multi-cell radio communications system is disclosed. In another embodiment, a radio for placing calls in a multi-cell radio communications system is disclosed.

BACKGROUND OF THE INVENTION

Mobile radio communications systems generally operate through a repeater wherein a first radio transmits a signal on a first frequency to a radio repeater that receives and retransmits the signal on a second frequency. The retransmitted signal can be received by a second radio, or a plurality of other radios. Repeater systems may comprise one or more radio repeaters each operating on a distinct pair or radio transmit and receive frequencies. A single pair of transmit and receive frequencies is called a channel. The radio coverage area of a repeater system is called a radio coverage cell, or simply a cell. Therefore, a repeater system, or system, defines a cell, and vice versa.

The repeater system architecture is used in many types of communications services, including land mobile radio, cellular telephone, radio paging, radio data systems, among others. It is common that a radio network is deployed which comprises a plurality of repeater systems so as to extend the geographic radio coverage area beyond that which a single repeater system or cell can cover.

In the land mobile radio environment, repeater systems having more than one channel trunk the repeaters together. Such systems are called trunked radio systems. A trunked radio system communicates with land mobile radios that have frequency agile transceivers that can dynamically access any one of several channels in any one of several repeater systems. In such a system, a communications protocol is employed to identify radios, identify repeater systems, control system access, identify radio call destinations, and other functions. Communications protocols have been developed which utilize in-band data, sub-audible data, and tone sequences to convey protocol information. Several protocols have become popular in the United States. Regardless of the protocol used, similar functions are provided for.

Another aspect of land mobile radio systems is that they are often interconnected with the public switched telephone network, PSTN, so that radio users can place and receive telephone calls. This is accomplished by interconnecting one or more repeaters with the PSTN. Telephone calls can originate in either the PSTN or from a mobile radio. Calls placed in this manner are called interconnect calls.

Another aspect of multi cell radio systems is that individual cells are joined to form a network by linking the repeater systems together and employing a network controller to manage call traffic between cells. In this environment, a radio located in a first cell can communicate with a radio located in a second cell by communicating from a first repeater system to a second repeater system over a network link. Such an architecture provides a great deal of convenience to end users in that the radio communications coverage area can be integrated over a wide service area.

Land mobile radios are programmed to operate in the particular communications environment for which they are intended. Each system will have one or more radio channels and each radio intended to operate in that system must be programmed with the particular frequency pairs associated with each channel in each system. Further, it is typical that each radio monitors a home channel in each system for the purpose or determining if the system is accessible and to determine if a call is being placed to the radio. If a radio is programmed to operate in more than one system, then the radio will have one or more channels for each system together with a designated home channel for each system programmed into a memory within the radio.

With regard to determining whether or not a system is accessible, several techniques have been employed. In the most basic approach, a radio merely attempts to establish a call by sending a signal to a system and waiting for a reply signal. If a signal is received, then the system is accessible. If no signal is received, then the system is not accessible. Another approach in testing for accessibility is to monitor signals and/or messages being transmitted by a system. If a radio is able to receive signals or messages, then the radio can assume that the system is accessible for the purpose of placing a call. There are certain drawbacks to the foregoing access testing techniques. In the case of merely attempting to place a call, there may be a substantial period of time required, depending on the particular protocol employed by a system, to determine that a system is not available. In the case of simply monitoring a system for signals or messages, there is a possibility that another system is operating co-channel with a desired system and the radio is falsely identifying the co-channel system. A refinement of this technique is to employ a protocol wherein each system transmits a unique system ID code that can be received by a radio to surely determine which system is being received. Even in this last case, there is a possibility that the receive range of the radio is greater than its transmit range. If this is the case, then the radio may attempt to place a call, only to have its transmissions ignored by the system due to the reduced coverage range on the mobile transmit frequency.

In a more advanced protocol design, radios check-in to each system when a system ID code is received. Because the check-in procedure involves the sending of signals and messages in both directions between the radio and the system, there is reliable confirmation that communications are possible.

Within each system are a pool of available ID codes that are transmitted on signals to determine which radio initiates and/or is intended to receive a particular call. Also, certain ID codes may indicate what type of call is being placed or received. For example, dispatch calls, interconnect calls, data calls, or network calls may have specific ID codes which identify the call type. Alternatively, data transmitted in the system, other than ID codes may be used to convey information about call types. However, generally, some form of identification, such as an ID code is necessary on a shared system in order to provide call privacy and to manage traffic flow.

Communications systems and networks provide a rather broad array of service options to end users. Upon placing a call, the user selects the repeater system or cell to be used for a call, and also the ID code and call type to be placed. This general format allows the user to specify the radio system used and the destination of each call placed. This offers a large degree of flexibility, however it can be problematic. If the user would select the wrong system, for example, the radio may be out of range of the selected system and be unable to initiate radio contact. If the wrong ID code is selected, the user may not initiate the desired type of call to be placed. In a similar fashion, if a particular user's radio is intended to receive a call, it is important that the radio be tuned to the correct channel and be monitoring a system which is in radio coverage range and to which a call will be addressed in order to contact the intended radio.

In the conventional form of trunked land mobile radio, the user selects a repeater system, SYSTEM, and a GROUP, to enable communications. The GROUP concept is grounded in the traditional dispatch call group being selected. In actuality, the SYSTEM specifies the repeater system and home channel which are monitored by the radio, and the GROUP specifies the ID code or codes used for communications. The SYSTEM/GROUP call selection scheme has certain draw backs in the modern multi-cell communications system. Firstly, it assumes the user is aware of which radio system or systems are within radio coverage range at any given time. Further, it assumes that the user knows to select an appropriate ID code, which selects the call type and call destination for each SYSTEM selected.

For example, if a user is a service vehicle which is currently located in the same cell as its dispatch office, it would be best to select the local SYSTEM and a GROUP which utilized a dispatch ID code in that system. This is because dispatch calls are generally fast, efficient and have a low cost as compared to other call types. The foregoing scenario is generally illustrated in FIG. 1. On the other hand, if the service vehicle is located in a cell remote from the dispatch office's cell, and the cell is not linked into a network with the dispatch office's cell, then a SYSTEM and GROUP should be selected which specify the local repeater system and an ID code which establishes a telephone call to the dispatch office. Note that in this example, the call is destined to a telephone at the dispatch office and not a radio. This scenario is generally illustrated in FIG. 3. Further, if the dispatch vehicle is located in a remote cell which is linked to the dispatch office's cell, then it may be appropriate for the user to select a SYSTEM and GROUP that specify an ID code which establishes a private radio to radio call to the dispatch office, over a network link connecting the two cells. This scenario is generally illustrated in FIG. 2.

As can be imagined, in a very large network with a complicated network link topology, the SYSTEM/GROUP selection combinations can become rather numerous and complicated for end users to understand. Clearly there is a need to simplify the selection of call destination for users roaming through a plurality of systems in a communications network.

As discussed earlier, certain trunking system protocols have become popular in the United States due to their vast deployment. One such protocol is the LTR® protocol developed by the E. F. Johnson Company of Waseca Minn. The LTR® protocol has become a defacto standard in a portion of the land mobile radio industry. Several manufacturers make radios and repeater equipment that are compatible with the protocol.

The LTR® protocol utilizes a sub-audible data stream for channel management and ID code communications. All channels in a given repeater system carry sub-audible data and may be specified as a home channel to mobile radios. The data stream on each channel comprises data frames, each having a data message. The mobile radio transmits a similar message to the repeater system and the combinations of transmission of the messages allow control of the trunked radio system.

Uniden America Corporation has developed an advanced trunking protocol and system which is backwardly compatible with the LTR® protocol. The advanced protocol is called the ESAS® protocol and is capable of emulating the functions of the LTR® protocol in addition to adding new functionality directed to network services, among others. New commands are used in the ESAS® protocol for various information including unique ID codes for radios (UID), telephone numbers, alphanumeric status messages, and other kinds of information.

The ESAS® system also comprises a network switch which is located at the repeater system site. The switch interprets ESAS® commands and data and routes call traffic both intra-site and intra-network. In addition, the protocol is capable of inter-network call management.

SUMMARY OF THE INVENTION

A method and apparatus for automatically selecting a radio system and call destination, which comprises an ID code, which is based on an initially selected call destination is disclosed. The present invention provides a simplified user call destination selection technique that selects a specific system and call destination based on a currently accessible system and call destination which are specifically associated with a preferred system corresponding to the currently accessible system.

A plurality of call records are stored in a memory in a radio wherein each call record includes a call destination that specifies, among other things, a specific call ID code. Each call destination is associated with a preferred system from which the call is preferred to be placed. The preferred system is associated with a system identifier stored in a system memory. The system memory has a plurality of storage locations for storing channel indicia in addition to the system identifiers. Each system identifier has at least one channel indicia associated with it. The channel indicia are used within the radio to indicate the precise transmit and receive frequencies of operation for each channel. Therefore, when a system identifier is know, and recalled for use within a radio, the precise frequencies of operation are known. The system identifiers stored in the system memory are further associated with a home channel channel indicia for systems which have a plurality of channel indicia.

An important aspect of the present invention is that a plurality of the call records are linked or grouped together such that the selection of one call record can result in the initiation of a call in accordance with a different call record that is linked or grouped to the selected call record. When a first call record is selected, such as by actuation of an actuator for selecting a specific call destination or call record by the user, a controller in the radio recalls a first call record, thereby defining a current call record which comprises a current call destination, a current preferred system, and a current link. The controller checks to determine if the preferred system is accessible for placing a call. If the preferred system is accessible, then a call is initiated to the current call destination and the call proceeds in a conventional fashion. On the other hand, if the preferred system is not accessible, then the controller recalls a second call record which is associated with the current link. The second call record is then defined as the current call record and the various elements of the record are defined as the current version, including the current call destination, current preferred system, and current link. The process of testing for accessibility to the current preferred system is again made and the results described before are again applied.

It is easiest to understand a benefit of the present invention by example. In FIG. 1, a radio user desires to call its office. The user actuates an actuator to select the OFFICE DIS- PATCH as the current call destination. This is a reasonable choice because during the majority of time, the user is working within the coverage area of the SOUTH system 104. Within the radio, the controller recalls a first call record, which is configured for a dispatch call ID on the SOUTH system. The radio checks to determine that the SOUTH system is accessible, and in this example it is, and proceeds to establish a dispatch call to the office, which is successful.

Referring to FIG. 2, the radio user has roamed to the coverage area of the CENTRAL system 102. The radio user, unaware that the coverage area has changed, again selects OFFICE DISPATCH as the desired call destination on his radio. However, when the controller recalls the first call record and determines that the preferred system, the SOUTH system, is inaccessible, the controller refers to the link in the current call record which refers it to a second call record that is configured to place a radio to radio call to the office from the CENTRAL system, via a network. The controller recalls the second call destination, and preferred system and test for accessibility. The test succeeds and the radio places the appropriate call, thereby completing the user's desired communication, namely contacting the office.

The linked list of call destinations can be of longer length too. In FIG. 3, the user has roamed to the NORTH system 100, and again selects the call destination OFFICE DISPATCH. Again, the first call destination with the SOUTH system being preferred cannot be accessed and the CENTRAL system for the second call destination via a radio to radio call from the CENTRAL system cannot be accessed. Therefore, the controller refers to the current link, which at this point is the link associated with the second call record for the CENTRAL system, which is linked to a third call record that is recalled as the current call record. This record comprises a call destination that is a telephone call to the office and the preferred system is the NORTH system. Since the NORTH system is accessible, the call is established and the user is able to communicate with the office, in this case via telephone.

It can be seen from the foregoing that the present invention provides a greatly simplified user interface in a complex communications environment. Further, it improves the probability that a call to a particular call destination will be completed without intervention by the user.

Further, it allows the integration of different call types by linking them together based on a desired call destination. In the foregoing example, a dispatch, radio to radio, and interconnect call were combined. It is to be understood that other call types could also be included Another aspect of the present invention is the radio's technique for informing the user as to how a particular call is being handled. Each call destination may have a call name or other identifier which is displayed on a display to inform the end users as to what particular call type is being placed.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

FIG. 6. is a diagram of a system table.

FIG. 7. is a diagram of a ID code table.

DETAILED DESCRIPTION

The present invention simplifies radio system selection and call destination selection by creating a linked list of call destinations which are automatically tested in sequence when a call is initiated. The linked list can be created by linking call destinations together by adding a pointer, called a link, to each call record, or by creating a call group list which is a list of call record pointers linked in a sequential fashion. In any case, the linked list is preprogrammed into a radio such that selection of a first call destination in the list selects a desired call destination which incorporates a call pointer, or link to another call destination. If the system to which the first call destination is directed is not accessible, the radio attempts to place the call to the next call destination in the linked list.

Figure 1:
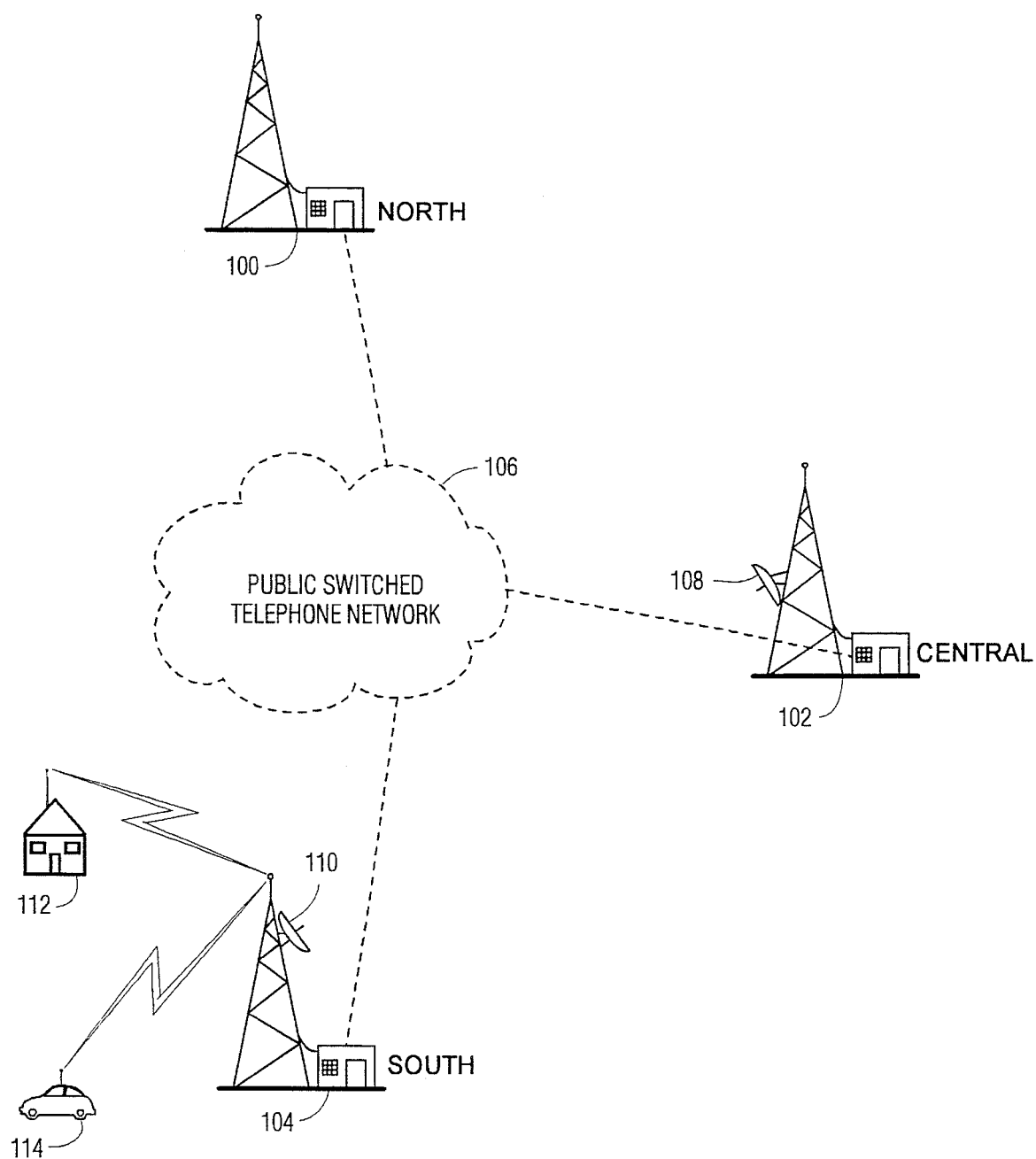
FIG. 1. is a system diagram of a local SYSTEM call.
Figure 2:
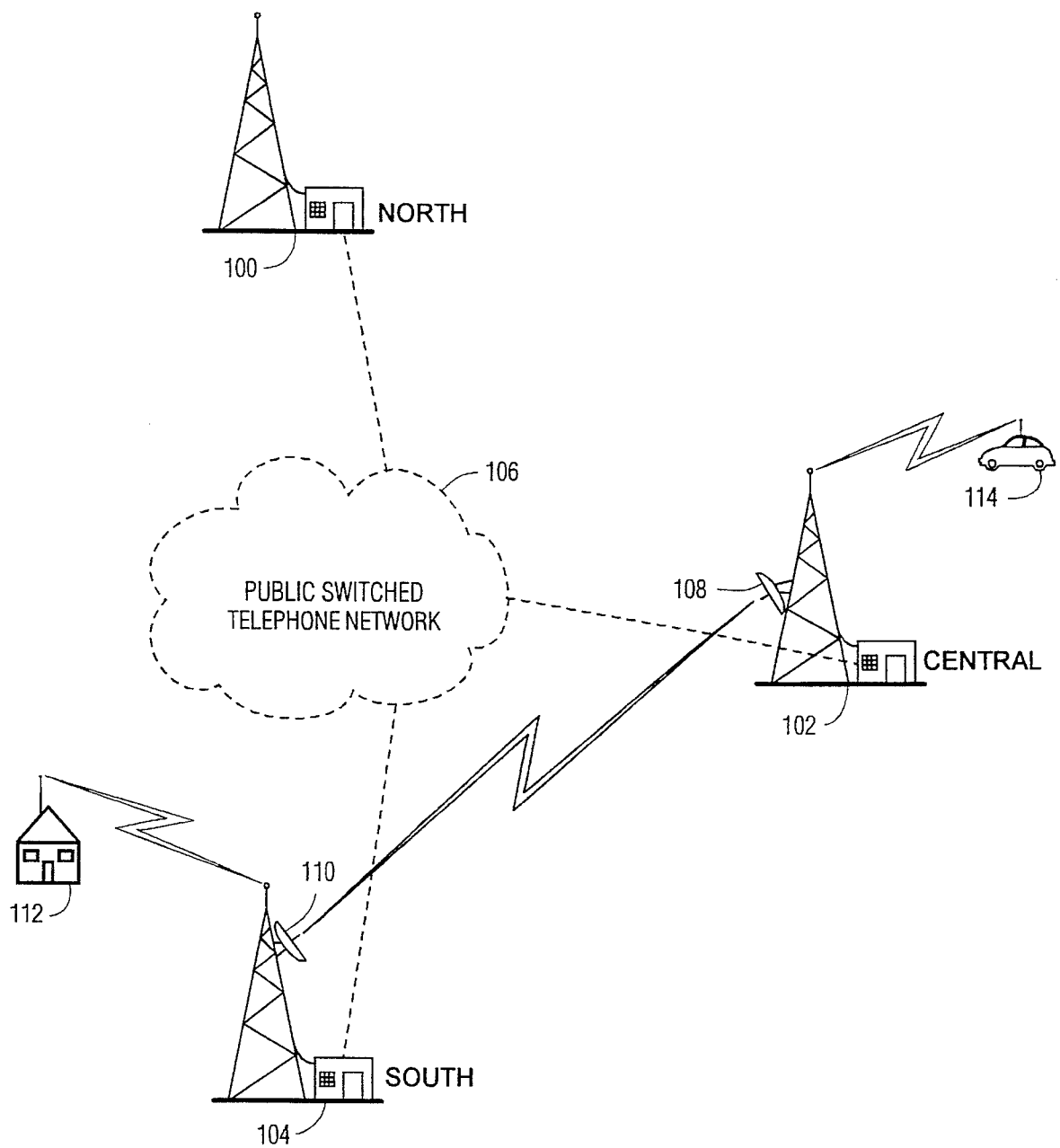
FIG. 2. is a system diagram of a network linked call.
Figure 3:
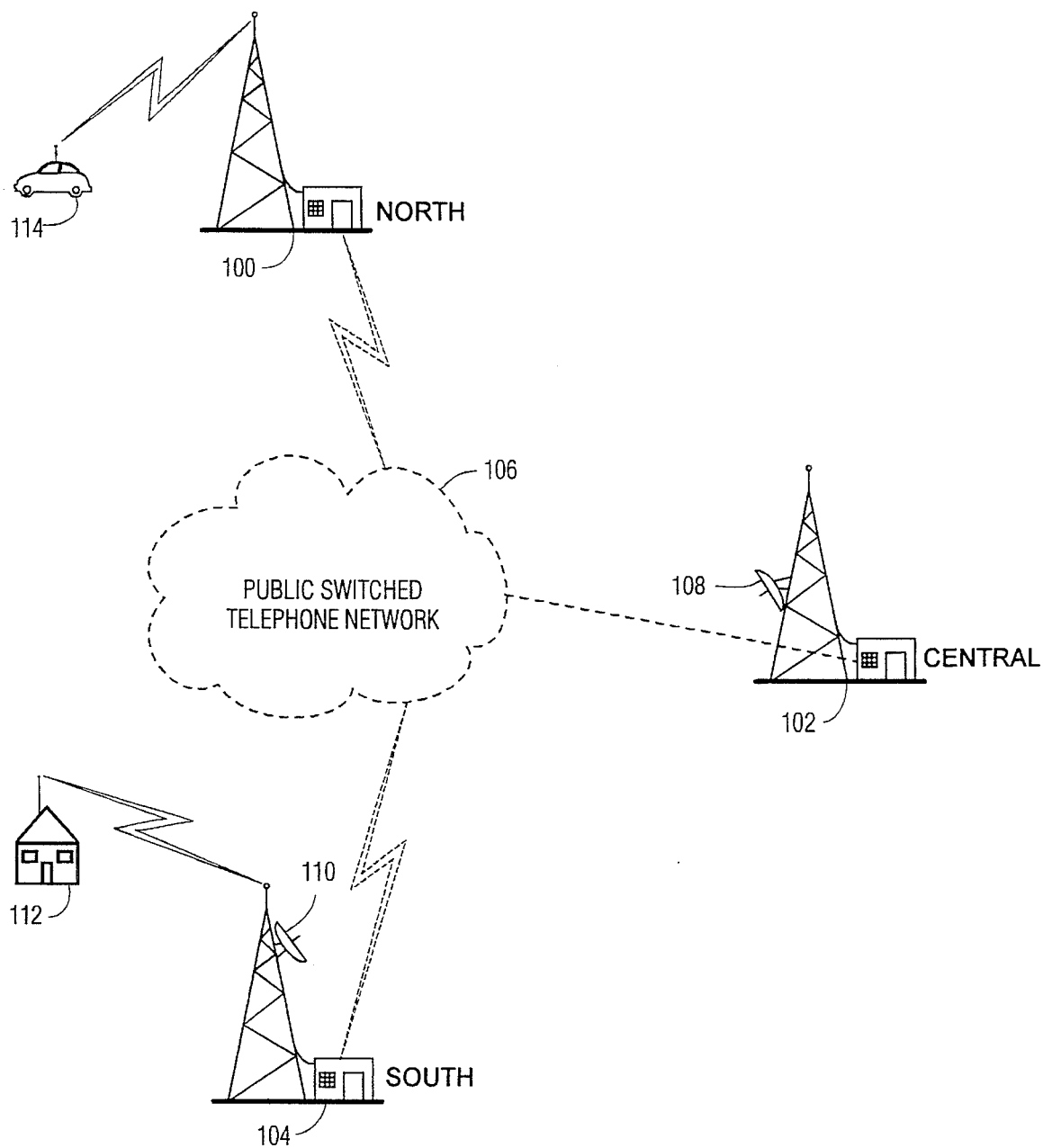
FIG. 3. is a system diagram of a telephone interconnect call.
Figure 4:
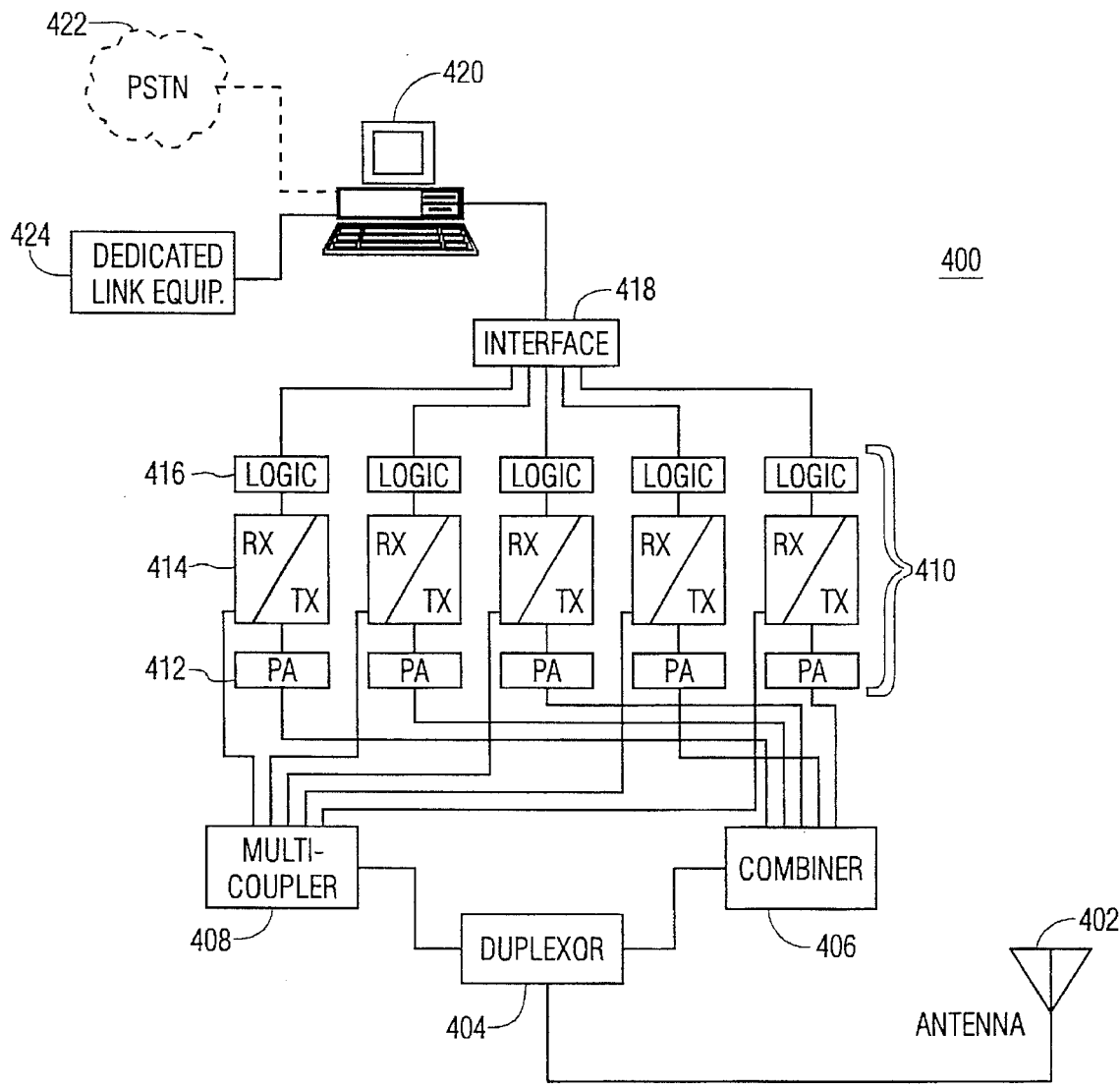
FIG. 4. is a functional block diagram of a five channel repeater system.

The preferred embodiment of the present invention is a multi-site trunked land mobile radio system similar to that illustrated in FIGS. 1 through 3. However, the number of systems within a multi-site system can be two or more. FIG. 4 illustrates the site equipment 400 in a typical system. This figure is only one example, other system configurations are commonly used. An antenna 402 transmits and receives radio signals from mobile units, (not shown), and couples these signals to a duplexer 404. The duplexer 404 separates the transmit and receive signals such that the transmit signals are coupled from combiner 406 and the receive signals are coupled to multicoupler 408.

A plurality of radio repeaters 410 are used, and in this example, five repeaters 410 are illustrated. Each repeater comprises a transceiver 414, a radio frequency power amplifier 412, and control logic 416. The output of each power amplifier is coupled to combiner 406, and the input to each receiver portion of each transceiver 414 is coupled from multicoupler 408. Audio and control circuitry for each repeater control logic unit 416 is coupled to an interface unit 418 which is, in turn, coupled to a site controller 420. The site controller may be based upon a personal computer or other similar control device. The site controller is coupled to other communications resources, such as the public switched telephone network, PSTN 422, or other dedicated inter-site link communications resources 424.

In the preferred embodiment, each system is configured such that audio signals can be switched between the various repeaters, the PSTN, and dedicated link equipment. Furthermore, the site controller operates a trunking and network data protocol which supervises mobile unit ID codes, channel ID codes, inter-site communications link management, and data communications. The Uniden ESAS® trunking system uses a system configuration as illustrated in FIG. 4.

Figure 5:
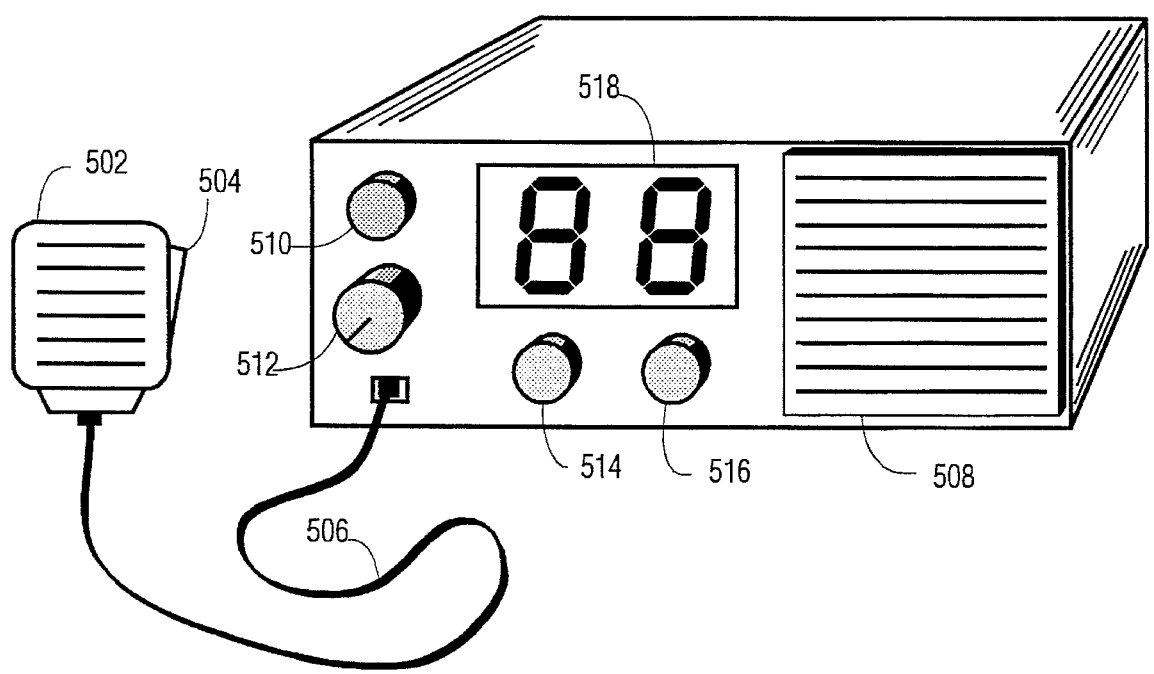
FIG. 5. is an illustration of a trunked land mobile radio.

Trunked land mobile radios are available in many configurations. FIG. 5 is one example of a trunked radio 500, as used in the LTR® and ESAS® protocol system. Other commonly used protocols employ mobile radios with similar configurations. The radio 500 is typical of the type used primarily for transmission trunked dispatch communications, however, half-duplex interconnect communications and data messaging are also accomplished with radios having this configuration.

The user of such a radio 500 speaks voice messages into microphone 502 which comprises a push-to-talk switch 504 that is activated to initiate communications. The microphone is coupled to the radio by a cord 506. The radio 500 comprises a power switch 510 and an audio volume control 512 which adjust the audio level of received voice messages which are reproduced by loud speaker 508. A SYSTEM selection knob 514 and a GROUP selection knob 516 are used to select the desired radio system with which to communicate and the desired talk group within the selected radio system. A display 518, typically having two numerical digits allows the radio to display up to ten different SYSTEMS and ten different GROUPS, in accordance with those selected by the user through activation of the SYSTEM 514 and GROUP 516 knobs.

The selection of a particular system with SYSTEM knob 514 directs a controller within the radio 500 to a memory table having system channel information and home repeater information stored therein. An example of a system table is shown in FIG. 6.

The SYSTEM table 600 comprises a plurality of storage locations arranged into a matrix. SYSTEMS numbered one through ten 602 identify one dimension of the matrix and are selected by the SYSTEM selection knob 514. The second dimension of the matrix identified arbitrary repeater numbers one through twenty 604. Due to the Federal Communications Commission rules on radio channel allocation, repeaters are trunked into groups no larger than twenty channels. In addition to the twenty arbitrary repeater numbers 604, each SYSTEM also comprises a home repeater, HR, 606. For each SYSTEM there may be stored up to twenty channel indicia 608 which are used by the radio to determine the frequency of operation for each radio channel. The channel indicia are arbitrarily assigned and are converted into PLL synthesizer frequency divisors for use in tuning the radio's transmitter and receiver.

Reviewing FIG. 6, it can be seen that not every SYSTEM has twenty repeaters having channel indicia associated therewith. The SYSTEM table represents the maximum SYSTEM programmability for the particular radio. In the example shown in FIG. 6, there are three SYSTEMS programmed, and SYSTEM 1 has five repeaters programmed, SYSTEM 2 has ten, and SYSTEM 3 has three repeaters programmed. The number of repeaters and channel indicia associated therewith correspond to the physical site equipment at each radio system in the trunked radio network. If a user selects SYSTEM 1 as the current system, according to the system table in FIG. 6, then the radio will be operable on channels according to channel indicia "200", "220", "240", "260", and "280", which correspond with repeater numbers "01", "03", "05", "07", an "09" respectively. Repeater "01" will be the home channel for operation on SYSTEM 1.

Having selected a radio system with SYSTEM knob 514, the user also must select a talk group using GROUP knob 516 so as to select an ID code with which to access the system. Reference is directed to FIG. 7 which is an ID code table 700 which is stored in a memory in a trunking system mobile radio. The ID code table 700 is arranged as a two dimensional matrix wherein the first dimension is defined by a SYSTEM selection and the second dimension is defined by the GROUP selection. In the present table, there are provided ten SYSTEMS 702 and ten GROUPS 704, which define one hundred ID code storage locations. The ID code table 700 correlates to the SYSTEM table 600 in that only three of the ten possible SYSTEMS have ID codes specified. For example, if the user had selected SYSTEM 1 706 and GROUP 1 708, then the ID code "001" would be used in subsequent calls to SYSTEM 1. Similarly, if GROUP 2 710 was selected, then ID code "007" would be used. Or, if GROUP 3 712 was selected, then ID code "188" would be used.

Each ID code may be interpreted by the radio and the SYSTEM as establishing one or more different call types. For example, ID code "001" may establish a group dispatch call. ID code "007" may establish a radio to radio call, and ID code "188" may establish a telephone interconnect call. The user must understand that the selection of a particular SYSTEM and GROUP setting on the radio will initiate a particular call type to a particular radio system.

In the LTR® protocol, the ID code is transmitted between the radio and system within a packet data protocol that provides several functions in the trunked land mobile radio system.

Figure 8:
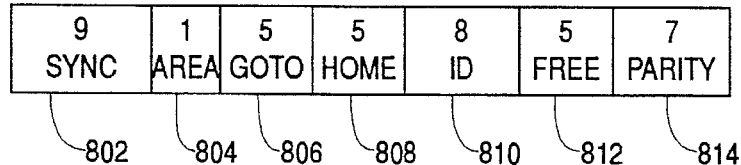
FIG. 8. is a diagram of a prior art LTR® repeater data frame.

Reference is directed to FIG. 8 which is a data diagram of the repeater data frame 800 used in the prior art ® protocol. This is a typical data message transmitted from a repeater in a system to radios. The data message comprises a nine bit synchronization field 802 which is detected by the radios and indicates the presence of and the beginning of a data message. An area bit 804 is used for distinguishing two different systems operating on the same channel. The five bit GOTO field 806 contains a repeater number and indicates which repeater should be received in order to receive a call. This field is essentially used for trunking channel management. The five bit HOME repeater field 808 indicates the home repeater of radios for which a particular call is intended. The eight bit ID code field 810 contains the ID code for which a call is intended. The five bit FREE repeater field 812 contains a repeater number and indicates which repeater is currently available for placing the next call. Finally, a seven bit PARITY field 814 is included for testing for data transmission errors.

Figure 9:
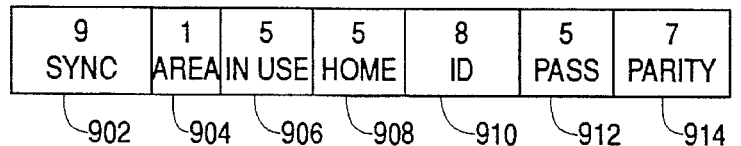
FIG. 9. is a diagram of a prior art LTR® radio data frame.

FIG. 9 is a data diagram of a radio data frame 900 in the prior art LTR protocol. The data fields generally correspond to those in the repeater data frame 800 except that the IN USE field 906 indicates which repeater is actually being transmitted to and PASS field 912 is used for a different protocol purpose. Fields 902, 904, 908, 910 and 914 correspond to fields 802, 804, 808, 810 and 814 in FIG. 8.

Figure 10:
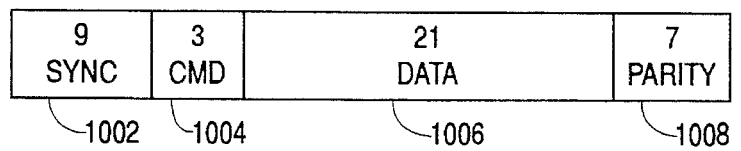
FIG. 10. is a diagram of a prior art ESAS® data frame.

As was discussed previously, the ESAS® protocol is an enhanced protocol that includes modifications beyond the LTR® protocol. FIG. 10 is a data diagram of a prior art ESAS® data frame 1000. The nine bit synchronization field 1002 and seven bit parity field 1008 are similar to those in the LTR® data, but the other fields found in the LTR® protocol data frames have been converted to a three bit COMMAND 1004 and twenty-one bit DATA FIELD 1006. Commands transmitted by the repeaters and radios include commands to establish a call, and the call destination is specified by data transmitted in the data field 1006. In addition, data from several messages can be concatenated to define call destinations which require more data bits than are available in the field. In this way, the ESAS® protocol allows a radio to send a specific telephone number, or a unique radio ID code in a call request. It should be understood that the ID code table utilized in an ESAS® compatible radio is capable of storing a great variety of call destinations, or ID codes.

Figure 11:
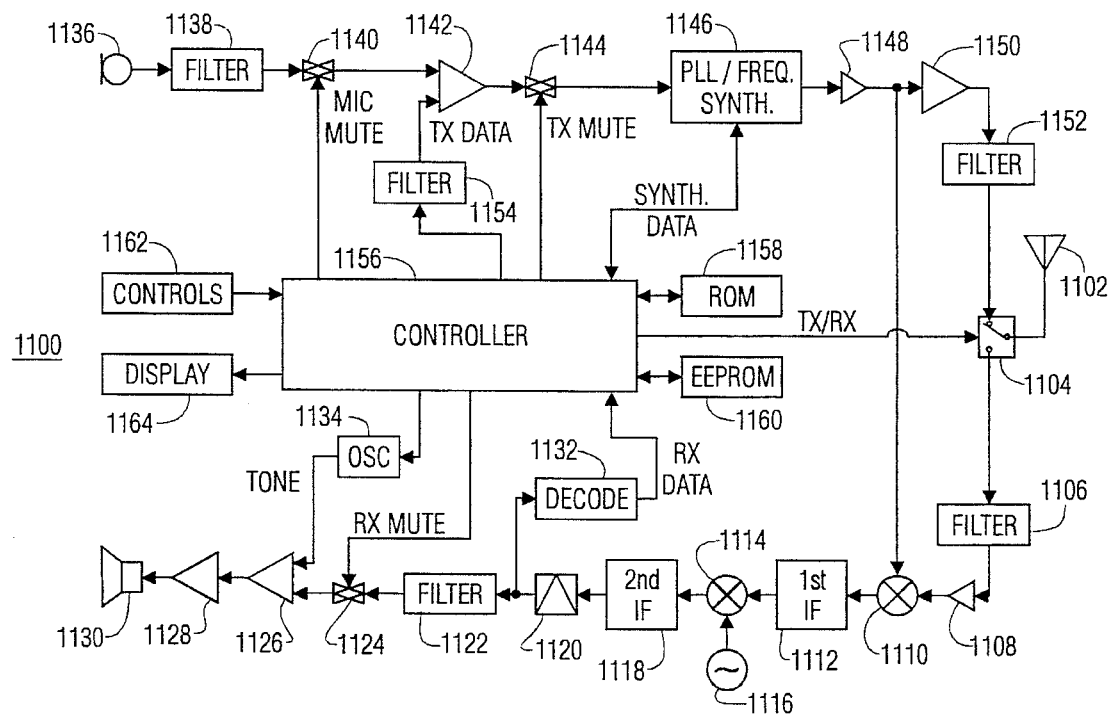
FIG. 11. is a functional block diagram of a land mobile radio in the preferred embodiment.

A functional block diagram of a half-duplex trunked land mobile radio is shown in FIG. 11. This is one version of a radio according to the preferred embodiment. An antenna 1102 is coupled to an antenna switch 1104 which is operable in either a transmit or receive position. In the receive position, signals are coupled from antenna 1102 to a receive band-pass filter 1106 which limit the band of signals that are passed along to receive amplifier 1108. The output of receive amplifier 1108 is coupled to a first mixer 1110 which also receive a first local oscillator signal from a PLL unit 1146 via buffer amplifier 1148.

Mixer 1110 down converts the received signal to a first intermediate frequency which is coupled to first IF amplifier 1112. The amplified first IF is subsequently coupled to second mixer 1114 which mixes the first IF with a second local oscillator signal produced by second local oscillator 1116. Second mixer 1114 further down converts the received signal to a second intermediate frequency which is coupled to second IF amplifier 1118. The second IF signal is coupled to FM detector 1120 which produces an audio base band output signal that is coupled to both a data decode circuit 1132 and to audio bandpass filter 1122.

Data decode circuit 1132 filters and shapes a subaudible data signal which comprises the aforementioned data packets that are commonly called RX DATA, which is coupled to controller 1156 for processing. The filtered audio is output from filter 1122 to a bilateral switch 1124 which is enabled and disabled by a RX MUTE signal from controller 1156. The switch 1124 serves as the audio mute control device in the radio. The received audio signal is further coupled to buffer amplifier 1126 where it is combined with audible tones produces by oscillator 1134, under control of controller 1156. The audible tones are used for various indications to the radio user concerning call progress and other functions. The output of buffer amplifier 1126 is coupled to audio power amplifier 1128 which drives loud speaker 1130.

While antenna switch 1104 is operated in the transmit position, acoustical signals are received by microphone 1136 and coupled to audio bandpass filter 1138, and subsequently to bilateral switch 1140. Switch 1140 is operated under control of controller 1156 and serves to mute the microphone signals. The output of switch 1140 is coupled to buffer amplifier 1142 where the audio signals are combined with TX DATA signals that are produced by controller 1156 and filtered by filter 1154. The TX DATA comprises the sub-audible TX data packets discussed hereinbefore. The output of amplifier 1142 is coupled to bilateral switch 1144 which provides the transmit mute function under control of controller 1156. The combined audio and data signal is then coupled to PLL units 1146.

PLL unit 1146 is an integrated phase locked loop frequency synthesizer and modulator which modulates a base band signal onto a radio frequency carrier in accordance with a frequency divisor provided by controller 1156. Synthesizer data is provided to the PLL unit 1146 in accordance with channel indicia which controller 1156 recalls from the system table stored in memory. Since each channel consists of a distinct transmit and receive frequency, controller 1156 provides a separate synthesizer divisor for transmit and receive operation on a given channel. In this way, PLL unit 1146 can provide an output, via buffer amplifier 1148 for either transmit power amplifier 1150 or first mixer 1110. During transmit operation, the output of buffer amplifier 1148 is coupled to RF power amplifier 1150 for power gain. The transmit signal is coupled to band pass filter 1152 and subsequently to antenna switch 1104, for connection to antenna 1102.

Internal operation of the radio 1100 is under control of controller 1156. A microcontroller is preferred. ROM memory 1158 stores executable software which embodies the various control sequences. Radio configuration and user selectable parameters are stored in EEPROM memory 1160 or alternatively in RAM memory (not shown). This includes the SYSTEM and ID code tables and other parameters which will be described hereinafter.

The user interface of the radio 1100 comprises a display 1164 and various user controls 1162. The preferred display is a multi-element liquid crystal type. Both the user controls and the display are described in combination with FIG. 12.

Figure 12:
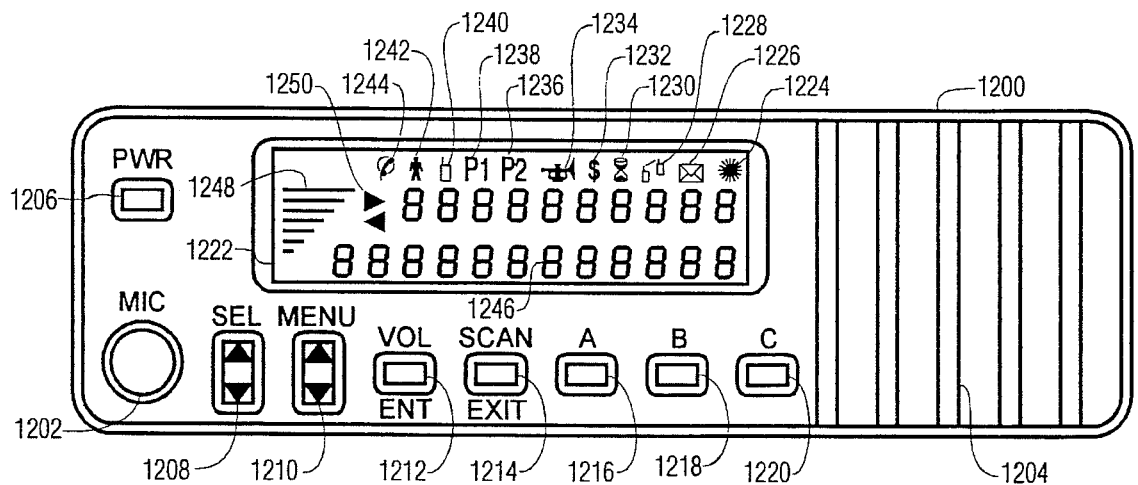
FIG. 12. is a diagram of the user interface in the preferred embodiment.

FIG. 12 is a diagram of the user interface on a trunked land mobile radio in the preferred embodiment. Of course, different radio configurations could be used to accomplish similar functions in either a mobile or portable radio configuration. The radio interface 1200 comprises a microphone connector 1202 for connecting a microphone having a push-to-talk switch to the radio (not shown). A loud speaker grill 1204 conceals and protects the loud speaker 1130. Power to the radio is switched on and off using power switch 1206.

The radio has several momentary contact switches 1208, 1210, 1212, 1214, 1216, 1218, and 1220 which are all coupled to controller 1156. With respect to the present invention, the user selects a call destination by scrolling through a menu of available call destinations, or call groups, and selects the desired call destination, or call group, and initiates the call.

Display 1222 is a liquid crystal type with a plurality of alpha-numeric digits 1246 for display call destinations and/or radio ID codes and telephone numbers. In addition, the display has a bar display 1248 for indicating various levels and arrow icons 1250 for assisting in menu selection and display scrolling. A plurality of specialized icons are provided for indicating various radio functions as tabulated below:

| Item | Description |
| --- | --- |
| 1224 | Transmitter On Indicator |
| 1226 | Data Message Indicator |
| 1228 | Talk-Around, (Non-Repeater), Indicator |
| 1230 | Wait Indicator |
| 1232 | Roam Indicator |
| 1234 | Vehicle Horn Honk Indicator |
| 1236 | Second Priority Indicator |
| 1238 | First Priority Indicator |
| 1240 | Half-Duplex Call Indicator |

-continued

| Item | Description |
|---|---|
| 1242 | Check-In Indicator |
| 1244 | Full-Duplex Call Indicator |

The icons listed above are activated by controller 1156 to indicate the functional status of the radio. For example, when a dispatch call destination is selected, the dispatch indicator 1240 is activated. Likewise, for radio-to-radio and interconnect calls, the radio-to-radio indicator 1242 and interconnect indicator 1244 are activated respectively.

In the preferred embodiment, with respect to the ESAS® protocol, the call destination information is programmed into the radio's EEPROM 1160 by the service provider prior to the time the radio is delivered to the end user. A part of the preparation process is for the end user to request a range of services and for the service provider to preprogram the radio in a way that best serves the end user's needs. A field programming unit is utilized by the service provider to enter data into the radio. However, it is certainly reasonable to provide a radio having a user interface that would allow the end user to enter configuration information in the field.

Figure 13:
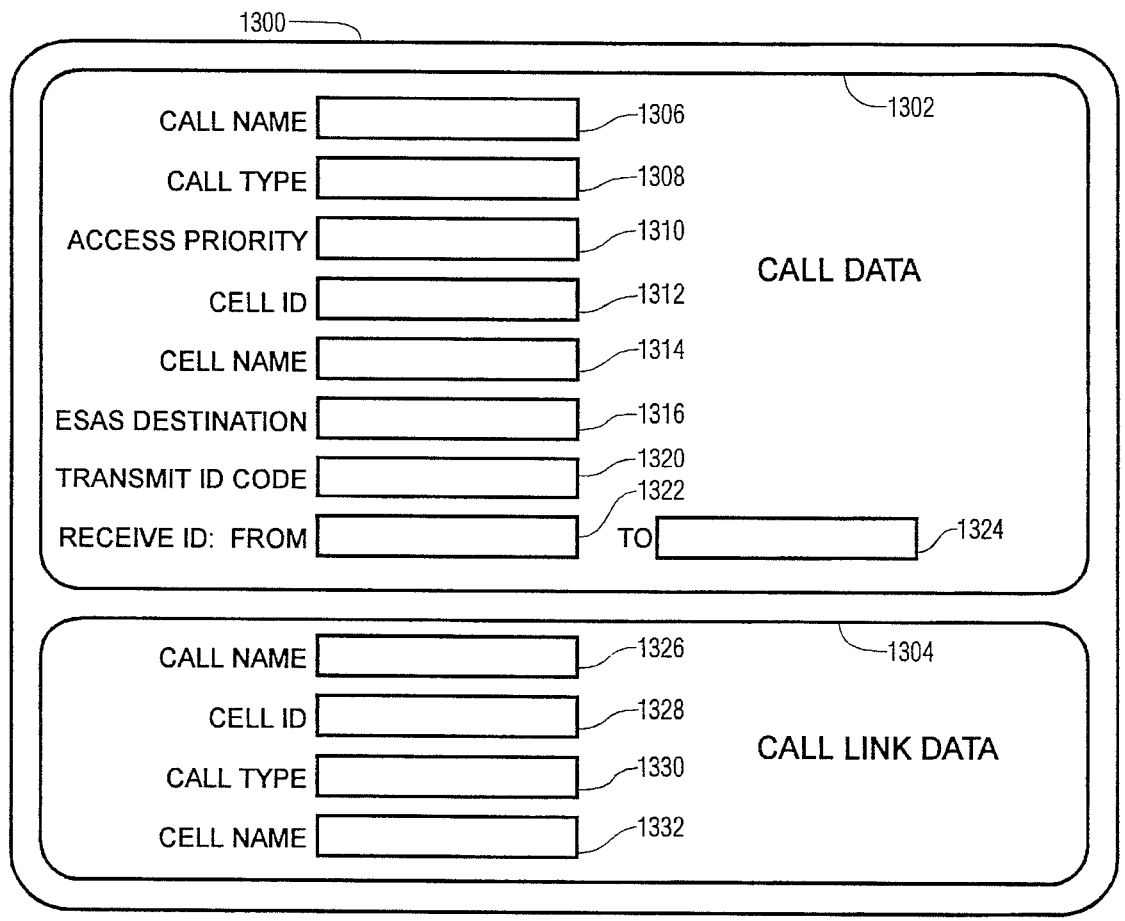
FIG. 13. is a diagram of the user interface display of the field programming unit in the preferred embodiment.

A field programmer unit may be a stand alone device or it may be a software application that runs on a personal computer. The interface between the field programming unit and the radio is typically an RS-232 serial connection. In operation, configuration data is entered into the field programming unit and edited to the desired functionality and then transferred into the EEPROM in the radio. FIG. 13 is representative of the field programmer display screen 1300 for entering call destination related information. In this illustration, a linked call group list is entered into a personal computer based field programming unit.

There are two basic portions of the data entry screen, the CALL DATA section 1302, and the CALL LINK DATA section 1304. In operation, the radio will attempt a call to a destination based on the CALL DATA for a selected call destination, and if the preferred system for that destination in not accessible, then the radio will use the CALL LINK DATA to change the current call destination to the one identified by the CALL LINK DATA.

In the CALL DATA portion, the system operator enters the CALL NAME 1306, which is an alphanumeric description intended to be easily understood by the end user. An example would be "DISPATCH OFFICE." The CALL TYPE field 1308 is selected from a list of call types and is used by the radio to configure the radio operation for the particular call type. Call types supported in the preferred embodiment are tabulated below:

| Call Type | Description |
|---|---|
| GID | LTR ® Dispatch call to a group ID code |
| UID | ESAS ® Radio to Radio unique ID code call |
| PHONE | ESAS ® Interconnect call |
| STATUS | ESAS ® Data message call |
| RIC | LTR ® Repeater interconnected call |
| TALK/AROUND | A non-repeater radio to radio call |

The ACCESS PRIORITY field 1310 is used to enter a relative access priority ranging from "0" to "15" which is used to prioritize ESAS® call access priorities. The CELL ID field 1312 is used to enter a cell ID code ranging from "0" to "127" and identify the preferred SYSTEM on which the call can be placed. The CELL NAME field 1314 is used to enter an alphanumeric string that is easily recognizable as the SYSTEM location, for example, "SOUTH SITE." The ESAS DESTINATION field 1316 is used to enter a dialing string to be transmitted from the radio to the repeater system at the time a call is placed. An example would be the destination telephone number in an interconnect call or the unique ID code of the destination radio in a radio-to-radio call. The TRANSMIT ID code field 1320 is used to enter the ID code to be used during transmissions by the radio during a GID or RIC call as listed above. The RECEIVE ID code TO 1322 and FROM 1324 fields are used to enter a range of ID codes which will be interpreted as valid during the reception of a call. Valid ID types are GID and RIC type ID code calls.

By entering a plurality of call data, the service provider builds a list of call destination which can be recalled by the end user for placing, or receiving, calls from/to the radio. The list resides in the memory of the field programming unit and is transferred to the radio and stored in the EEPROM in the radio.

Each call may have an associated CALL LINK. The CALL LINK DATA is entered in the CALL LINK DATA portion 1304 of the field programmer screen. The fields include a CALL NAME field which is filled by selecting a previously entered call destination call name from the list of call destination. In the present example, the call name might be "Office Radio Call" which means a radio to radio call would be placed directly to the dispatch office. Upon selecting a call name in the CALL LINK DATA portion 1304, the field programming unit completes the remaining fields with data from the call destination database, which includes the preferred CELL ID field 1328, the CALL TYPE field 1330, and the CELL NAME field 1332. These are displayed for the convenience of the operator of the field programming unit.

Upon entering all of the desired call destination and the desired link information, the data is transferred into a call record memory in a radio.

Figures 14, 15:
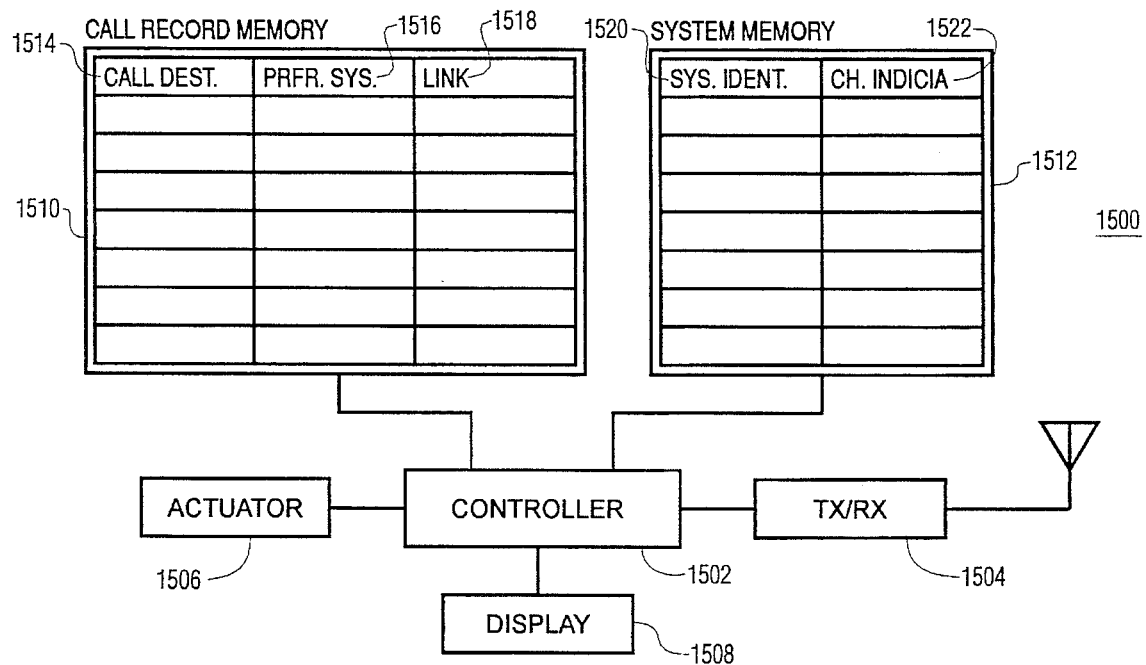
FIG. 14. is a diagram of the call record memory in the preferred embodiment.
FIG. 15. is a functional diagram of a land mobile radio in the preferred embodiment.

FIG. 14 is a memory diagram of the call record memory 1400, stored in the EEPROM in the radio. The memory comprises a plurality of storage locations for storing data which correspond to the call data entered into the field programming unit. The radio assigns an arbitrary record number 1402 to each call record which is used as a pointer to each call record by the radio software. The table is organized into 128 call record storage locations 1422, which is a reasonable number of call records for a given radio, although other size memories could certainly be configured. The fields stored for each call record are as follows. The "CALL TYPE" field 1404 corresponds to same field entered into a Field Programming Unit (FPU). The "CALL NAME" field 1406 is the same alphanumeric string as in the FPU and is used in the radio to display a user friendly name on the display of the radio to inform the user of the current call destination. The "ACCESS PRIORITY" field 1408 corresponds to that in the FPU. The "CELL ID" field 1410 corresponds to that in the FPU. The "ESAS DESTINATION" field 1412 corresponds to that in the FPU. The TRANSMIT and RECEIVE ID fields 1414, 1416, and 1418 correspond to those in the FPU. The "CALL LINK" field 1420 contains a link to the call which is redefined as the current call when a particular record can not be used as the current call because its preferred system is not accessible.

In subsequent discussions, each call record is discussed in terms of having two or three basic portions. First is the call destination which includes all the call record information except the "CELL ID" and the "LINK." The "CELL ID" is referred to as the preferred system portion and the "LINK" is referred to as the link portion.

Reference is directed to FIG. 15 which is a diagram of a mobile radio 1500 in the preferred embodiment which utilizes the linked call record embodiment of the present invention. A controller 1502 controls the radio and executes object code software from a ROM memory, not shown. The controller 1502 is operably coupled to a transceiver 1504 such that data messages can be communicated to and from the controller 1502 and the transceiver 1504, and subsequently to one of a plurality of systems with which the radio communicates. One or more actuators 1506 are coupled to the controller 1502 to allow user input and selection of at least a first call destinations. A display 1508 is coupled to controller 1502 and is operable to display call names, called numbers, and other call process related information. One aspect of this is that the display 1508 is operable to display the type of call presently designated as the current call destination. For example, dispatch call, interconnect call, radio-to-radio call, status call, and etc.

Two different memory structures are illustrated in FIG. 15. The SYSTEM MEMORY 1512 has a plurality of storage locations which are used for storing a system identifier 1520 and wherein each system identifier has at least one channel indicia 1522 associated therewith. When controller 1502 has a current call destination which includes a current system identifier, then a channel indicia associated with the current system identifier is recalled to control the frequency of operation of the radio. In some instances, one or more system identifiers may have a plurality of channel indicia associated therewith. This is typical of the situation where the radio system is a trunked group of repeaters. In a trunked group, each channel indicia is associated with a repeater number and the trunking protocol, described hereinbefore, identifies which of the plurality of channel indicia associated with a given system identifier is to be used in any particular instant. In any case, the system identifier ultimately identifies a particular frequency of operation for the radio based on the channel indicia.

The second memory structure illustrated in FIG. 15 is the CALL RECORD MEMORY 1510. This memory has a plurality of storage locations for storing call destination information 1514, preferred system information 1516, and link information 1518. As was described earlier, the call destination information 1514 includes a variety of data about each call. This data will vary depending on the call type, but will always include some information about an ID code or call destination number which is utilized by the radio when a call is initiated or received. The preferred system information 1516 is essentially the cell ID used for a given call and this cell ID points to the system identifier 1520 in the SYSTEM MEMORY 1512. The concept of a preferred system relates to the ESAS® protocol wherein certain call types can be successfully placed through a system other than the preferred system. The link information 1518 identifies the call record which is identified as the current call record in the event the preferred system of a present call record is not accessible by the radio. The link information 1518 can be implemented in several forms. It can be a pointer to another call record, it can be a call record number, it can be a call name, or other suitable identifier.

In operation, a user of the radio of the type illustrated in FIG. 15 selects a call destination by actuating the actuator and selecting a specific call destination. In the preferred embodiment, the display displays an alphanumeric string which is easily recognizable to the user as the desired call destination. The controller recalls the preferred system from the selected call record, which identifies a system identifier in the system memory, which further identifiers a channel indicia that allows the controller to change the frequency of operation of the transceiver to the required frequency for the desired call.

The controller checks to determine if the preferred system is accessible. If it is, then the selected call is initiated. However, if the preferred system is not accessible, then the controller recalls the link for the current call record, and the link directs the controller to a second call record that is then identified as a new current call record. The process of testing to determine if the preferred system is accessible is repeated and so forth. This process is repeated until a call record is found for which the preferred system is accessible, or until a call record is recalled that does not contain a link to a subsequent call record.

During the process of identifying a call which can be placed, the controller displays the call destination for the call record that is identified as the current call destination. The reason for this is so that the user can be notified as to what type of call is being placed. This is useful because the user may operate the radio differently depending on what kind of call is placed. For example, a dispatch call is transmission trunked and requires the user to press the PTT button and repeatedly access the radio system and, an interconnect call is conversation trunked and the user proceeds through the call progress tones of ringing, busy, answer, and etc. before the conversation can commence.

Another aspect of the present invention is the method used by the controller to determine whether or not a system is accessible. In the most basic configuration, the controller merely transmits a call request to the preferred system and waits for a reply. If a reply is received, the call commences. On the other hand, if a reply is not received, then the system is determined to not be accessible. In a somewhat more advanced system design, the controller tunes its receiver to receive the preferred system and monitors to determine if a data message, cell beacon, or other identifiable signal is received which indicates that the preferred system is in radio range and that the correct system is being received, versus a co-channel system, for example. In a still more advanced system configuration, the radio transmits a check-in message to the preferred system and receives an acknowledgment which indicates that the radio is known by itself and the system to be in radio communications range of the preferred system. This scheme has distinct advantages in the situation where calls are being received by the radio from the system. It should be understood that when the user selects a call destination, the radio doesn't necessarily have to change the current system of operation. Practically speaking, most users operate within a single system during the majority of time. In the case where a new call destination is selected, but that selection does not change the preferred system, and the fact that the radio has been monitoring the preferred system, or has been checked-in to the preferred system prior to the call destination selection, allows the radio to determine virtually instantly whether or not the preferred system for the newly selected call destination is accessible or not.

Figure 16:
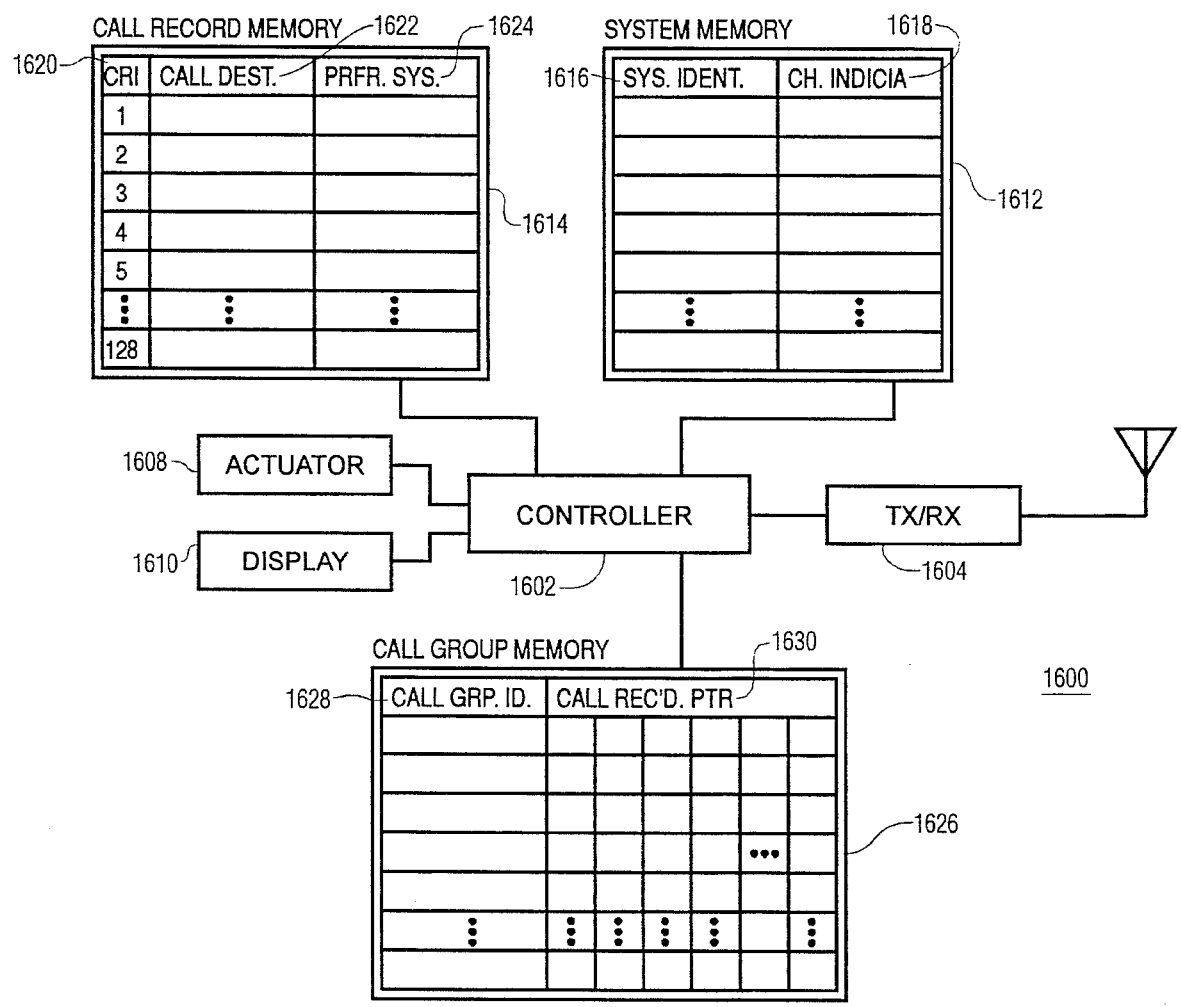
FIG. 16. is a functional diagram of a land mobile radio in the preferred embodiment.

A second embodiment of the present invention is illustrated in FIG. 16. This embodiment employs a call group list which differs somewhat from the linked list approach used in the embodiment illustrated in FIG. 15. In FIG. 16, a radio 1600 comprises a controller 1602, a transceiver 1604, at least one actuator 1608, a display 1610 and a plurality of memories 1612, 1614, and 1626. The memories comprise a system memory 1612, a call record memory 1614, and a call group memory 1626. All of the elements of this radio correspond to the similar elements in FIG. 15, with the exception of the call record memory and the call group memory. The call record memory 1614 does not have storage locations for link information as did the radio in the embodiment in FIG. 15. Rather, a call group memory 1626 is used to store a plurality of call group identifiers 1628. Each call group identifier is an alphanumeric string which can be displayed on display 1610 and which gives an easily understandable name to each call group. Each call group identifier 1628 is associated with a ordered list of call record pointers 1630. When a call group identifier 1628 is selected by actuation of actuator 1608, the controller 1602 recalls the first call record pointer associated with the selected call group ID and uses this pointer to identify a current call record, together with its related current fields of information. As in the previously described embodiment, the controller tests to determine if the preferred system is accessible, and if it is, the radio proceeds with the selected call. On the other hand, if the current preferred system is not accessible, then the controller recalls the next call record pointer from the ordered list 1630 associated with the presently selected call group ID and this pointer in turn identifies another current call record.

In a similar fashion to the previous embodiment, the controller sequentially tries all the call destination in the call group until either an accessible system is found, all of the call record pointers have been tested.

The call group embodiment has certain advantages. One option is to have the controller recirculate through the list of call records until one of the systems becomes accessible. Another is that any given call record can be a member of more than one call group.

Figure 17:
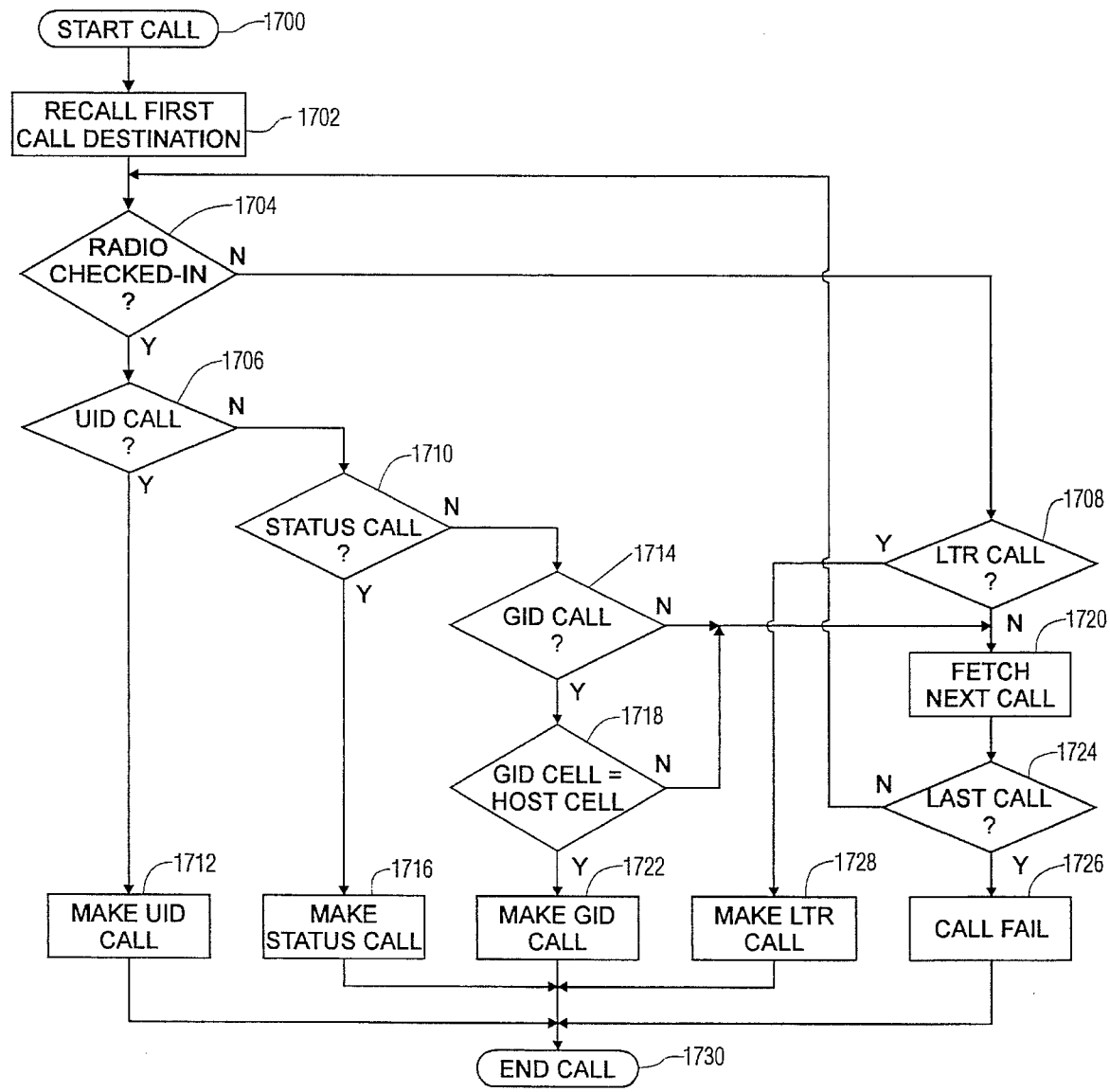
FIG. 17. is a software flow diagram of the preferred embodiment.

In the preferred embodiment, a multi-mode radio is provided that operates in either the LTR® or ESAS® protocol environments. In fact, the radio is designed to operate in networks which mix systems operating within each protocol. FIG. 17 is a software flow diagram which illustrates the method of placing a call, from a call group within such an environment. The process begins at step 1700 where the user has selected a call destination, or in effect, a call group. The controller recalls the first call destination its corresponding preferred system at step 1702. In the ESAS® environment, the controller checks to see if it is checked-in to the preferred system at step 1704. If the radio is not checked-in, then the only call type possible is one according to the LTR® protocol and the radio proceeds to step 1708.

Alternatively, at step 1704, is the radio is checked-in to an ESAS® system, then the controller checks to see if the current call type is for a UID call at step 1706. If a UID call type is found at step 1706, then the radio makes the UID call at step 1712 and ends the call at step 1720. Alternatively, if the call type is not UID at step 1706, then the controller checks to see if the call type is a status call at step 1710. If a status call type is found, then the radio makes a status call at step 1716 and ends the call at step 1730. Alternatively, at step 1710, if a status call type is not found, then the controller checks to see is a GID call type is found at step 1714. A GID call type is typically a dispatch call, but could also be a RIC telephone interconnect call.

If a GID call type is found at step 1718, then the controller checks to determine if the current host cell is equal to the preferred system for the present GID call. If it is, then the preferred system is accessible and the controller places the call at step 1722 and ends the call at step 1730. Alternatively, at step 1718, if the host cell is not equal to the preferred system, then the controller proceeds to step 1720 to fetch the next call from the call group. Likewise, at step 1714, if the call type was not a GID call, then no identifiable call type has been found and the controller proceeds to step 1720 to fetch the next call in the call group.

After fetching the next call at step 1724, the controller checks to see if the last call has been recalled at step 1724. If not, the flow recirculates to step 1704 and the process reiterates. Alternatively, if the last call has been checked at step 1724, then the controller indicates that the call failed at step 1726 and ends the call at step 1730. Referring back to step 1708, if an LTR call type is found, then the controller makes an LTR call at step 1728 and ends the call at step 1730. The foregoing sequence is a specific embodiment used in a dual mode ESAS®/LTR® radio. It has a bias toward placing ESAS® calls over other calls types.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A radio, operable to place a call to a preferred destination by user selection of a current call record, the radio operable to check accessibility of a current preferred system defined by the current call record, and if the current preferred system is not accessible, the radio further operable to recall a different call record defined by a current link in the current call record, thereby redefining the current call record to be utilized in placing the call to the preferred destination, the radio comprising:

a call record memory comprising a plurality of storage locations for storing a plurality of call records, and wherein at least a portion of said call records further comprise a call destination, a preferred system, and a link;

a system memory comprising a plurality of storage locations for storing a plurality of system records, each of said plurality of system records further comprise a system identifier having at least one channel indicia;

a transceiver for receiving and transmitting signals between the radio and a plurality of systems, and wherein said transceiver is controllable to operate on a plurality of channels for communicating with said plurality of systems in accordance with said channel indicia;

a controller, coupled to said call record memory and operable to recall call records therefrom, said controller coupled to said system memory and further coupled to said transceiver and operable to recall any of said channel indicia from said system memory in accordance with any one of said plurality of preferred systems recalled from said call record memory, and an actuator, coupled to said controller and operable to select a first call record as the current call record thereby defining a current call destination, the current preferred system and the current link in accordance with said first call record, said actuator further causing said controller to check said current preferred system to determine if it is accessible, and upon finding that said current preferred system is not accessible, causing said controller to recall a second call record in accordance with the current link, and further redefining the current call record in accordance with said second call record.

2. The radio in claim 1, further comprising:

a memory having a host system storage location for storing a current host system, said current host system being confirmed by a check-in procedure wherein said controller causes said transceiver to handshake with a system in order to establish and verify communications there between, thus confirming said current host system, and wherein said controller checks said preferred system to determine if it is accessible by comparing said current preferred system and said current host system.

3. The radio in claim 1, and wherein:

said controller checks said current preferred system to determine if it is accessible by enabling said transceiver to receive a cell beacon on said current preferred system in accordance with said channel indicia, and upon not receiving said cell beacon within a first period of time, said controller determines that said current preferred system is not accessible.

4. The radio in claim 1, and wherein:

said controller checks said current preferred system to determine if it is accessible by enabling said transceiver to receive a signal on said current preferred system in accordance with said channel indicia, and upon not receiving a signal having at least a minimum threshold signal strength within a first period of time, said controller determines that said current preferred system is not accessible.

5. The radio in claim 1, further comprising:

a display coupled to said memory for displaying a call destination message, and wherein at least a portion of said call records further comprise a call destination message, and wherein said actuator causes said controller to define a current call destination message in accordance with said current call record and further to cause said controller to display said current call destination message on said display.

6. A radio, operable to place a call to a preferred destination by user selection of a call group record, thereby specifying a current call record, the radio operable to check accessibility of a current preferred system defined by the current call record, and if the current preferred system is not accessible, the radio further operable to recall a different call record defined by the call group, thereby redefining the current call record to be utilized in placing the call to the preferred destination, the radio comprising:

a call record memory comprising a plurality of storage locations for storing a plurality of call records, and wherein at least a portion of said plurality of call records further comprise a call record identifier, a call destination, and a preferred system;

a system memory comprising a plurality of storage locations for storing a plurality of system records, each of said plurality of system records further comprising a system identifier and at least one channel indicia;

a call group memory comprising a plurality of storage locations for storing a plurality of call group records, each of said plurality of call group records further comprising a call group identifier and a plurality of call record identifiers organized in an ordered list;

a transceiver for receiving and transmitting signals between the radio and a plurality of systems, and wherein said transceiver is controllable to operate on a plurality of channels for communicating with said plurality of systems in accordance with said channel indicia;

a controller, coupled to said call record memory and operable to recall any of said plurality of call records therefrom, said controller coupled to said system memory and operable to recall any of said plurality of system records therefrom, said controller coupled to said call group memory and operable to recall any of said plurality of call records therefrom, and an actuator coupled to said controller and operable to select a first call group record stored in said call group memory, and further to recall the current call record from said call record memory in accordance with a first ordered call record identifier associated with said first call group record, and wherein a current call destination and a current preferred system are defined in accordance with said current call record, and wherein actuation of said actuator causes said controller to check said current preferred system to determine if it is accessible, and upon finding that said current preferred system is not accessible, recalling a second ordered call record identifier, thereby defining a second call record as the current call record.

7. The radio in claim 6, further comprising:

a memory having a host system storage location for storing a current host system, said current host system being confirmed by a check-in procedure wherein said controller causes said transceiver to handshake with a system in order to establish and verify communications there between, thus confirming said current host system, and wherein said controller checks said preferred system to determine if it is accessible by comparing said current preferred system and said current host system.

8. The radio in claim 6, and wherein:

said controller checks said current preferred system to determine if it is accessible by enabling said transceiver to receive a cell beacon on said current preferred system in accordance with said channel indicia, and upon not receiving said cell beacon within a first period of time, said controller determines that said current preferred system is not accessible.

9. The radio in claim 6, and wherein:

said controller checks said current preferred system to determine if it is accessible by enabling said transceiver to receive a signal on said current preferred system in accordance with said channel indicia, and upon not receiving a signal having at least a minimum threshold signal strength within a first period of time, said controller determines that said current preferred system is not accessible.

10. The radio in claim 6, further comprising:

a display coupled to said memory for displaying a call destination message, and wherein at least a portion of said call records further comprise a call destination message, and wherein said actuator causes said controller to define a current call destination message in accordance with said current call record and further to cause said controller to display said current call destination message on said display.

11. A method of placing a call from a radio to a preferred destination in a communications network having a plurality of systems, wherein the radio comprises a call record memory for storing a plurality of call records and wherein at least one call record further comprises a link to another call record, the method comprising the steps of:

selecting a first call record having a first call destination, a first preferred system, and a first link associated therewith as a current call record, thereby defining a current call destination, a current preferred system in accordance with the preferred destination, and a current link in accordance with said first call record;

checking to determine if the current preferred system is accessible for communications, and upon finding that the current preferred system is not accessible for communications, automatically selecting a second call record based on said current link, thereby redefining said current call record in accordance with said second call record and the preferred destination.

12. The method of claim 11, and wherein:

said checking step is accomplished by testing to see if the radio is currently checked in to said preferred system.

13. The method of claim 11, and wherein:

said checking step is accomplished by enabling the radio to receive a signal in accordance with said current preferred system for a first period of time, and if a cell beacon is not received within said first period of time, determining that said current preferred system is not accessible.

14. The method of claim 11, and wherein:

said checking step is accomplished by enabling the radio to receive a signal in accordance with said current preferred system for a first period of time, and if a signal having at least a minimum signal threshold is not received within said first period of time, determining that said current preferred system is not accessible.

15. The method of claim 11, and wherein said at least one of said plurality of call records further comprises a call destination message, and wherein the radio comprises a display, the method further comprising the steps of:

defining a first call destination message as a current call destination during said selecting step, and displaying said current call destination message on the display.

16. A method of placing a call from a radio to a preferred destination in a communications network having a plurality of systems, wherein the radio comprises a call record memory for storing a plurality of call records and further comprises a call group memory, and wherein the call group memory comprises at least a first call group of call record identifiers, the method comprising the steps of:

selecting a call group comprising a plurality of call identifiers, recalling a first call record identifier from said call group, which corresponds to a first call record having a first call destination and a first preferred system;

defining said first call record as a current call record, thereby defining a current call destination and a current preferred system in accordance with the preferred destination;

checking to determine if the current preferred system is accessible for communications, and upon finding that the current preferred system is not accessible for communications, automatically recalling a second call record identifier corresponding to a second call record, thereby redefining said current call record in accordance with said second call record and the preferred destination.

17. The method of claim 16, and wherein:

said checking step is accomplished by testing to see if the radio is currently checked in to said preferred system.

18. The method of claim 16, and wherein:

said checking step is accomplished by enabling the radio to receive a signal in accordance with said current preferred system for a first period of time, and if a cell beacon is not received within said first period of time, determining that said current preferred system is not accessible.

19. The method of claim 16, and wherein:

said checking step is accomplished by enabling the radio to receive a signal in accordance with said current preferred system for a first period of time, and if a signal having at least a minimum signal threshold is not received within said first period of time, determining that said current preferred system is not accessible.

20. The method of claim 16, and wherein said plurality of call records further comprises a call destination message, and wherein the radio comprises a display, the method further comprising the steps of:

defining a first call destination message as a current call destination in accordance with said current call record, and displaying said current call destination message on the display.

* * * * *